(12) United States Patent
Ganszki et al.

(10) Patent No.: US 11,458,814 B2
(45) Date of Patent: Oct. 4, 2022

(54) ROTARY OPERATING ELEMENT FOR OPERATING A VENTILATION NOZZLE IN AN AUTOMOBILE PASSENGER COMPARTMENT

(71) Applicant: fischer automotive systems GmbH & Co. KG, Horb a.N. (DE)

(72) Inventors: Tobias Ganszki, Waldachtal (DE); Daniel Kleinmann, Sindelfingen (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 337 days.

(21) Appl. No.: 16/819,730

(22) Filed: Mar. 16, 2020

(65) Prior Publication Data

US 2020/0298673 A1 Sep. 24, 2020

(30) Foreign Application Priority Data

Mar. 18, 2019 (DE) .................... 10 2019 106 818.5

(51) Int. Cl.
*B60H 1/34* (2006.01)
*F16D 1/033* (2006.01)

(52) U.S. Cl.
CPC .......... *B60H 1/3414* (2013.01); *F16D 1/033* (2013.01); *B60H 2001/3471* (2013.01)

(58) Field of Classification Search
CPC .......... B60H 1/3414; B60H 2001/3471; F16D 1/033
USPC .......................... 454/152–155; 403/335, 338
See application file for complete search history.

(56) References Cited

U.S. PATENT DOCUMENTS

| | | | |
|---|---|---|---|
| 1,911,181 A * | 5/1933 | Cornell, Jr. ........ | B60K 15/0406 220/293 |
| 2015/0233502 A1* | 8/2015 | Williams ............... | F16L 17/02 29/428 |
| 2017/0057328 A1* | 3/2017 | Sano ..................... | B60H 1/3442 |
| 2017/0248151 A1* | 8/2017 | Nelson .................. | F04D 29/044 |
| 2017/0328414 A1* | 11/2017 | Sadabadi ............... | F16B 7/182 |

FOREIGN PATENT DOCUMENTS

| | | |
|---|---|---|
| DE | 907 482 B | 3/1954 |
| DE | 196 16 232 A1 | 10/1997 |
| DE | 19935549 A1 | 11/2000 |
| DE | 102006049367 B4 | 10/2009 |
| JP | H09164837 A | 6/1997 |
| JP | 2008169911 A | 7/2008 |

OTHER PUBLICATIONS

Search Report for corresponding German Patent Application No. 10 2019 106 818.5, dated Nov. 29, 2019.

* cited by examiner

*Primary Examiner* — Ko-Wei Lin
(74) *Attorney, Agent, or Firm* — Renner, Otto, Boisselle & Sklar, LLP

(57) ABSTRACT

A rotary operating element for operating a ventilation nozzle in an automobile passenger compartment. The rotary operating element includes a first rotation body and a second rotation body, which are held against one another in a form-locked manner by tensioning elements. The tensioning elements are disposed spaced radially apart from a rotary operating element longitudinal axis and, starting at a particular torque threshold value, the form fit between the first and second rotation bodies is released, whereby the ventilation nozzle to be operated is protected against damage and/or faulty operation.

10 Claims, 4 Drawing Sheets

ROTARY OPERATING ELEMENT FOR OPERATING A VENTILATION NOZZLE IN AN AUTOMOBILE PASSENGER COMPARTMENT

CROSS-REFERENCE TO RELATED APPLICATIONS

This application claims priority under 35 USC § 119 to German Patent Application No. 10 2019 106 818.5, filed on Mar. 18, 2019, the entire disclosure of which is incorporated herein by reference.

TECHNICAL FIELD

The invention relates to a torque-limiting rotary operating element.

DISCUSSION OF THE RELATED ART

Torque-limiting rotary operating elements, also known as "slip clutches," have been known for quite some time and are available in a number of variations. A slip clutch shall, in particular, be understood to mean an automatically torque-switching safety coupling. These are used to protect parts of systems against damage. The slip clutch is usually disposed between two shafts. When a defined torque is reached, the clutch disconnects or connects the shafts, without outside intervention. The detent torque limiter working through positive locking is a special form of the slip clutch. This functions in such a way that, for example, spring-loaded balls, bolts, pins or the like move reversibly out of corresponding grooves when the defined torque is reached.

The disadvantage of the majority of torque-limiting rotary operating elements from the prior art is the usually relatively complex design thereof.

SUMMARY

It is an object of the invention to create a rotary operating element having a simple design, for use in an automobile passenger compartment, and in particular for operating a ventilation nozzle in an automobile passenger compartment. In particular, in the case of ventilation nozzles designed as ball nozzles, a regulated air volume is achieved by way of a rotation of the ball about a nozzle axis. Closing flaps in the ball nozzle, which regulate the air volume and/or control the direction thereof, are moved as a result of the rotation. The rotational forces occurring in the process can easily damage the ball nozzle if rotational forces continue to be applied to the corresponding closing flap due to faulty operation, for example after the closing flap has reached an end stop. Such damage due to faulty operation is to be prevented by the present invention.

The invention provides a rotary operating element for operating a ventilation nozzle in an automobile passenger compartment, wherein the rotary operating element comprises a first rotation body that extends along a rotary operating element longitudinal axis and can be rotated about the rotary operating element longitudinal axis. Hereafter, the rotary operating element longitudinal axis is only referred to as "longitudinal axis." The first rotation body is, in particular, configured to be cylindrical and, in particular, rotationally symmetrical with respect to the longitudinal axis. The first rotation body is intended to be connected to an operating element, in particular a handle, a lever or the like for adjusting the ventilation nozzle. The first rotation body comprises an operating element side therefor. The operating element side can be configured in a variety of ways. For example, the operating element side can include a handle for a user of the ventilation nozzle or a coupling piece for such a handle. Moreover, the first rotation body has a first contact side located opposite the operating element side, wherein the first rotation body extends between the operating element side and the first contact side along the longitudinal axis. A first contact surface oriented perpendicularly with respect to the longitudinal axis is formed on the first contact side. The first contact surface is, in particular, configured to be rotationally symmetrical with respect to the longitudinal axis and, in particular, has the shape of a circular disk.

Moreover, the rotary operating element comprises a second rotation body extending along the longitudinal axis. Similarly to the first rotation body, the second rotation body is also configured, in particular, to be rotationally symmetrical with respect to the longitudinal axis and, in particular, to be cylindrical. The second rotation body is likewise rotatable about the longitudinal axis. It includes an output side and a second contact side located opposite the output side. The output side is configured so as to be connectable to portions of the ventilation nozzle to be adjusted. A connection to the ventilation nozzle to be adjusted may also be implemented by way of connecting elements. The rotary operating element may thus be configured in a variety of ways on the output side, as long as a connection suitable for adjusting the ventilation nozzle can be established. The second rotation body extends between the output side and the second contact side. A second contact surface is disposed on the second contact side and is oriented perpendicularly with respect to the rotary operating element longitudinal axis. The second contact surface is, in particular, configured to be rotationally symmetrical with respect to the longitudinal axis and, in particular, has a shape corresponding to the shape of the first contact surface, and in particular the shape of a circular disk. In particular, the first and second contact surfaces have an identical radial extension with respect to the longitudinal axis.

So as to be able to transfer a rotational movement of the rotary operating element about the longitudinal axis from the first rotation body to the second rotation body, and thus transfer a rotational movement to the ventilation nozzle to be controlled, the first and second contact surfaces are held in operative connection in a force-fit and/or form-locked manner by a tensioning element. "Operative connection" here means that the tensioning element holds the first and second contact surfaces, and thus the first and second rotation bodies, non-rotatably against one another, relative to one another with respect to the longitudinal axis, up to a predetermined torque, this being the torque threshold value, so that frictional and/or shearing forces can be transferred from the first to the second contact surface. The torque threshold value is to be adapted to the ventilation nozzle to be operated. The operative connection can take place in a purely force-fit manner or in a purely frictionally engaged manner. However, a form-locked operative connection is preferred, which offers the advantage that a user of the rotary operating element receives clear haptic feedback when the operative connection between the first and second contact surfaces is interrupted. A combination of a force-fit and a form-locked connection is also possible. The operative connection is interrupted whenever a torque threshold value is exceeded. When the torque threshold value is exceeded, the operative connection between the first and second contact surfaces is interrupted at least such that further rotation of the first rotation body does not result in the second rotation body being rotated as well. With a predefined configuration of the contact surfaces, the torque threshold value is essentially determined by the tensioning force of the tensioning element. If the tensioning force is selected to be "high," the force causes the first and second contact surfaces to act "strongly" against one another, which consequently results in a strong force-fit and/or form-locked connection. If the tensioning force is selected to be rather "low," the torque threshold value is consequently likewise lower, whereby the operative connection is consequently released at lower forces. The tensioning element can be configured as a tension or compression spring.

It is a characteristic of the invention that the tensioning element is disposed on the first and on the second rotation body radially spaced apart from the rotary operating element longitudinal axis. In this way, a particularly simple and compact configuration of the rotary operating element is possible. Moreover, the special "outside" arrangement allows the tensioning element to be disconnected from the first and second rotation bodies, without first having to remove the first rotation body from the second rotation body.

The tensioning element is preferably configured as an, in particular, approximately right-angled U-shaped clamp, which, in particular, comprises a first and second spring leg and, in particular, a connecting web connecting the spring legs.

Preferably an, in particular circular, edge is disposed on an outer side of the first or second contact surface, based on the longitudinal axis in the circumferential direction, which extends, in particular, parallel to the longitudinal axis. Together with the contact surface on which it is disposed, the edge forms a kind of receptacle, which ensures that the first and second contact surfaces cannot be displaced relative to one another in a direction perpendicular to the longitudinal axis when the first and second contact surfaces are operatively connected. In other words, the edge ensures that the first and second contact surfaces, and thus the first and second rotation bodies, always remain centered with respect to one another, and in particular oriented coaxially with respect to one another.

So as to further improve the centering of the first and second rotation bodies and prevent tilting between the first and second rotation bodies when these are being twisted counter to one another, an in particular cylindrical centering shank can be disposed on the first contact surface of the first rotation body. This is oriented coaxially to the longitudinal axis and extends in the direction of the second contact surface of the second rotation body. An in particular cylindrical centering depression, which corresponds to the centering shank, can be provided on the second contact surface of the second rotation body. The centering depression is oriented coaxially to the longitudinal axis and extends in the direction of the output side of the second rotation body. The centering shank, in particular, corresponds to the centering depression in a form-locked and clearance-fit-like manner. The centering shank and the centering depression thus form a kind of pivot bearing, thereby further optimizing a rotation of the first and second rotation bodies with respect to one another. The centering shank can also be disposed on the second rotation body and, consequently, the centering depression can accordingly be disposed on the first rotation body.

In addition, multiple securing elements, and in particular securing studs, can be disposed on the edge, which extend in the direction of the rotary operating element longitudinal axis. In particular, the securing studs are rotationally symmetrical and correspond to securing recesses, and in particular securing grooves, which extend from an outer circumference of the first contact surface and the first bearing surface in the direction of the rotary operating element longitudinal axis. In particular, the securing studs, together with the securing grooves, ensure that the first and second rotation bodies can only be disconnected from one another when the securing grooves and the securing studs are congruently oriented.

So as to ensure that the tensioning element can be attached as easily as possible and with sufficient stability on the first and second force absorption bodies, in a further advantageous embodiment of the invention, the first rotation body includes a first bearing surface, and the second rotation body includes a second bearing surface. The first bearing surface extends, in particular, perpendicularly to the longitudinal axis. Moreover, the first bearing surface is, in particular, configured in a collar-like manner and, in particular, configured to be rotationally symmetrical with respect to the longitudinal axis. The first bearing surface can also be configured as one or more groove-like depressions in the first rotation body, which extend from an outer side of the first rotation body in the direction of the longitudinal axis. In particular, with such a configuration, the groove-like depressions are cohesively configured such that a single groove-like depression that is rotationally symmetrical with respect to the longitudinal axis completely surrounds the first rotation body in the circumferential direction. The first bearing surface is disposed between the first contact surface and the operating element side. However, the first bearing surface is preferably spaced apart from the first contact surface by only a few percent, based on an overall length of the first rotation body. "A few percent" shall, in particular, be understood to mean a range between 5% and 30%.

The second bearing surface on the second rotation body likewise extends, in particular, perpendicularly to the longitudinal axis and is, in particular, configured to be rotationally symmetrical thereto and, in particular, to be circular. Similarly to the first bearing surface, the second bearing surface can also be configured as a groove or as multiple grooves, which are provided in the second rotation body. The configuration of the second bearing surface on the second rotation body can be identical to the configuration of the first bearing surface on the first rotation body. The second bearing surface is disposed between the second contact surface and the output side. However, similarly to the first bearing surface, the second bearing surface is preferably also spaced apart from the second contact surface by only a few percent, based on an overall length of the second rotation body. "A few percent" shall, in particular, also be understood to mean a range between 5% and 30% here.

The orientations of the first and second contact surfaces and of the first and second bearing surfaces favor optimal functionality of the rotary operating element. The first bearing surface faces the operating element side, and the second bearing surface faces the output side. The first and second bearing surfaces thus face away from one another. The first contact surface faces away from the first bearing surface and faces the second contact surface when the first rotation body is disposed on the second rotation body as intended. Accordingly, the second contact surface faces away from the second bearing surface and faces the first contact surface.

The tensioning element has a first end and a second end. In the case of the preferred approach, in which, in particular, a right-angled, U-shaped clamp serves as the tensioning element, the first end corresponds to the first spring leg, and the second end corresponds to the second spring leg, wherein the spring legs are connected by the connecting web. So as to hold the first and second contact surfaces in operative connection, the first end is operatively connected to the first bearing surface, and the second end is operatively connected to the second bearing surface. In particular, at least a portion of the first spring leg rests against the first bearing surface, and at least a portion of the second spring leg rests against the second bearing surface. Bearing takes place, in particular, across the entire surface area. However, bearing can also take place in a linear or punctiform manner, as a function of the configuration of the clamp. Linear bearing takes place, in particular, when the first and second ends each have a kind of linear elevation, which are oriented in the direction of the respective bearing surface.

In particular, the connecting web ensures that the first and second ends are able to exhibit a resilient effect. For this purpose, as is common for such clamps, the connecting web can curve convexly or concavely with respect to the longitudinal axis due to bending or may already be configured to be convex or concave. However, it is also possible for the connecting web to be rigid, and thus to be oriented substantially parallel to the longitudinal axis. In this way, the ends are accordingly designed to be spring-elastic. The first and second spring legs are, in particular, oriented substantially perpendicularly to the longitudinal axis.

As a result of the first bearing surface preferably being disposed "close" to the first contact surface, and the second bearing surface preferably being disposed "close" to the second contact surface, the connecting web can be relatively "short," which enables a compact design of the U-shaped clamp. However, without departing from the concept according to the invention, it is also possible to dispose the first bearing surface "close" to the operating element side, and to dispose the second bearing surface "close" to the output side, which would not impact the function of the rotary operating element in general. The tensioning element, in particular the U-shaped clamp, and in particular the connecting web, would only have to be extended as appropriate for this purpose.

In addition, hook elements can be disposed on the first and/or on the second spring legs, which can engage in corresponding recesses in the respective bearing surfaces, whereby the clamp is secured against inadvertent detachment from the first and second bearing surfaces. Moreover, the first and/or the second spring legs can comprise reinforcements, bends or the like, whereby optimal bearing and optional retention can be further enhanced.

As a result of the first bearing surface preferably being disposed "close" to the first contact surface, and the second bearing surface preferably being disposed "close" to the second contact surface, the connecting web can be relatively "short," which allows for a compact design of the U-shaped clamp. However, without departing from the concept according to the invention, it is also possible to dispose the first bearing surface "close" to the operating element side, and to dispose the second bearing surface "close" to the output side, which would not impact the function of the rotary operating element in general. The tensioning element, in particular the U-shaped clamp, and in particular the connecting web, would only have to be extended as appropriate for this purpose.

In a further advantageous embodiment of the invention, the rotary operating element is designed as a kind of detent torque limiter. For this purpose, the first contact surface includes multiple elevations, and in particular a plurality of elevations that are rotationally symmetrical with respect to the longitudinal axis and extend in the direction of the second contact surface. The elevations are spaced apart radially with respect to the longitudinal axis and, in particular, disposed on a shared circumference. The elevations correspond to multiple, and in particular a plurality of, depressions provided in the second contact surface, in particular likewise on a shared circumference. "Correspond" shall be understood to mean that, in particular, the number of elevations is identical to the number of depressions. Moreover, the shapes of the elevations and of the depressions are configured so as to correspond to one another. The elevations can be configured as hemispheres or ball segments. In this case, the depressions are also accordingly hemisphere- or ball segment-shaped. In this way, the elevations are able to "glide" with respect to the depressions when the torque threshold is reached. The elevations and the corresponding depressions can be configured in a variety of ways. By way of example, only pin-like, bolt-like or multi-edge-like configurations of the elevations, with accordingly corresponding configurations of the depressions, shall be mentioned here.

The tensioning element holds the first and second contact surfaces in operative connection, and thus holds the elevations in the depressions. The tensioning force of the tensioning element, and the elevations and depressions, have to be matched to one another such that, starting at the predetermined torque threshold value, an elevation glides out of a corresponding depression. In this state, the first and second contact surfaces are not in operative connection within the meaning of the invention. Upon further rotation, the corresponding elevation glides back into a depression, thereby re-establishing the operative connection. The configuration of the rotary operating element as a detent torque limiter offers the user the advantage of clear haptic feedback.

In a further advantageous embodiment of the invention, multiple tensioning elements, in particular configured as U-shaped clamps, are each operatively connected to the first and second bearing surfaces. The tensioning elements are, in particular, identically configured and are rotationally symmetrical to one another with respect to the longitudinal axis. By using multiple tensioning elements, it is possible to better or more easily set a defined tensioning force between the first and second bearing surfaces. Moreover, it is thus ensured that the tensioning elements are disposed, in particular, rotationally symmetrically with respect to the longitudinal axis, and thus, in particular, at equidistant distances from one another, so that the tensioning force can be exerted uniformly distributed on the first and second bearing surfaces. The rotary operating element preferably comprises four tensioning elements, which form a four-fold rotational symmetry, which is to say a respective 90° angle to one another, with respect to the longitudinal axis.

So as to ensure that the tensioning element or the tensioning elements cannot rotate together with the first or the second rotation body, retaining elements can be disposed on the first or on the second rotation body, which hold the tensioning elements in a stationary manner on the first or on the second rotation body, so that the tensioning elements are non-rotatable with respect to the rotation body comprising the retaining elements.

In a further advantageous embodiment of the invention, the first rotation body includes a first through-opening extending along the longitudinal axis, and the second rotation body includes a second through-opening extending along the longitudinal axis, so that the rotary operating element forms a hollow shaft. The first through-opening is, in particular, disposed coaxially to the first rotation body, and the second through-opening is disposed coaxially to the second rotation body. The through-openings can have differing or identical diameters. The advantage of the through-openings can be seen in allowing electrical feed lines, for example, to be run through the rotary operating element. Moreover, the special configuration allows material to be saved during the production of the rotary operating element.

So as to be able to optimally set the tensioning force between the first and second bearing surfaces for the ventilation nozzle to be used, in a further advantageous embodiment of the invention, the tensioning element is, or the tensioning elements are, made of a metal or a plastic material. Tensioning elements made of metal, in general, have a higher modulus of elasticity than tensioning elements made of plastic material. A combination of tensioning elements made of plastic material and made of metal is also conceivable. Both variants are relatively easy to produce. Tensioning elements made of metal, and in particular the above-described U-shaped clamps, can be produced from bent sheet metal parts, for example. Tensioning elements made of plastic material can be produced, for example, by way of an injection molding process. Both variants are thus relatively easy and cost-effective to produce.

In a further advantageous embodiment of the invention, the first and second rotation bodies are made of a plastic material. The advantages are that these can be produced by way of injection molding. Moreover, the use of plastic ensures that the rotary operating element has the lowest weight possible and that, additionally, a movement of the first and second rotation bodies relative to one another produces as little noise as possible.

In a further advantageous embodiment of the invention, the U-shaped clamp, or the U-shaped clamps, can be pulled off the first bearing surface of the first rotation body, and off the second bearing surface of the second rotation body, in a direction facing away from the longitudinal axis, whereby the first rotation body can be disconnected from the second rotation body. In particular, the U-shaped clamps can be pulled radially, with respect to the longitudinal axis, off the first and second bearing surfaces. The ability to pull these off and/or place these on enables very easy removal or installation of the rotary operating element. Moreover, the individual clamps can be easily replaced, for example due to individual clamps being defective or so as to subsequently adapt these to the desired tensioning force.

The features and feature combinations, designs and embodiments of the invention mentioned above in the description, and the features and feature combinations mentioned hereafter in the description of the figures and/or shown in a figure, can be used not only in the respective indicated or shown combinations, but also in other essentially arbitrary combinations, or alone. Embodiments of the invention that do not include all the features of a dependent claim are possible. It is also possible to replace individual features of a claim with other disclosed features or feature combinations.

The invention will be described hereafter based on one exemplary embodiment.

DETAILED DESCRIPTION

Figure 1:
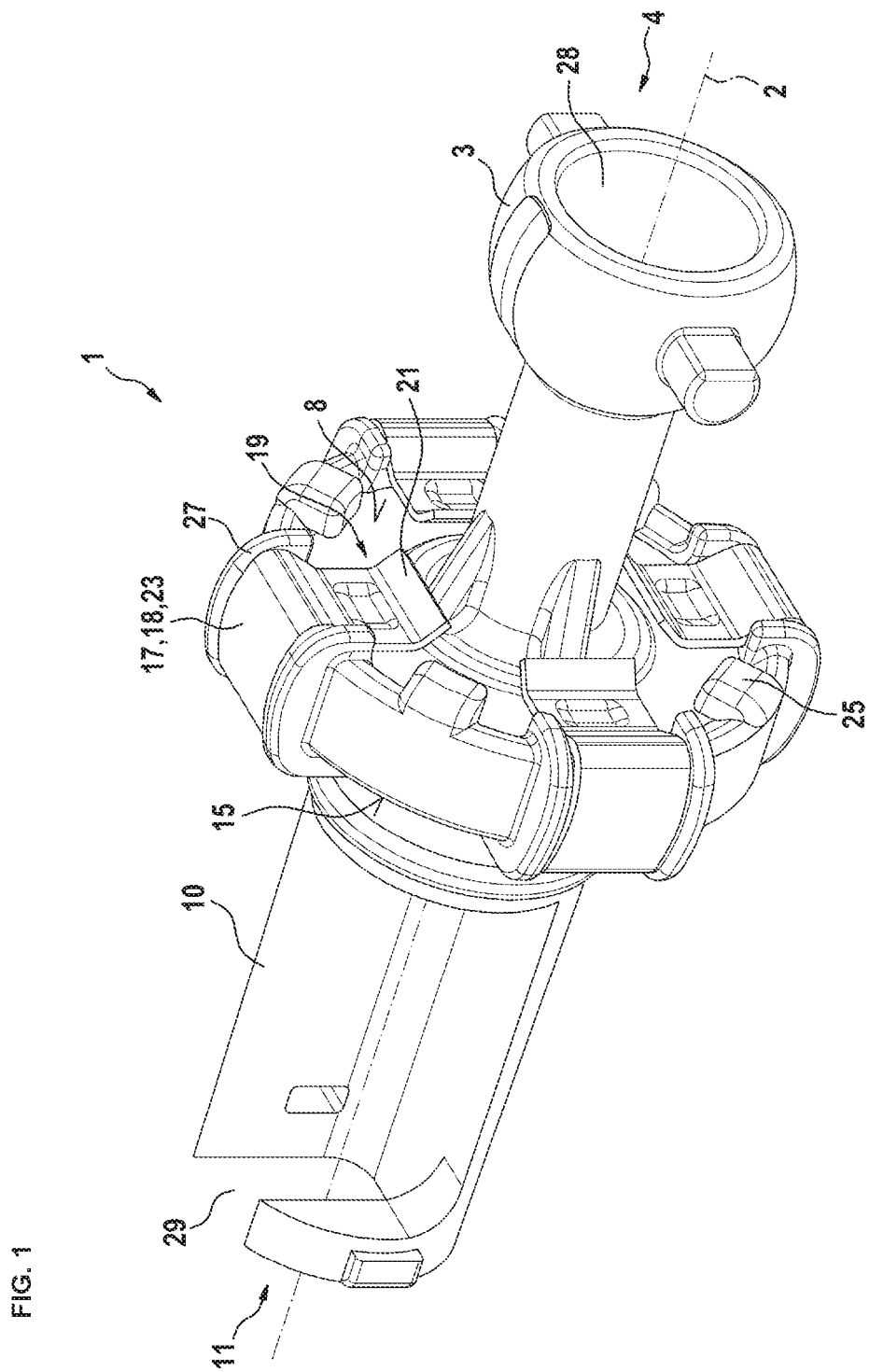
FIG. 1 shows a rotary operating element according to the invention in a perspective illustration.
Figure 2:
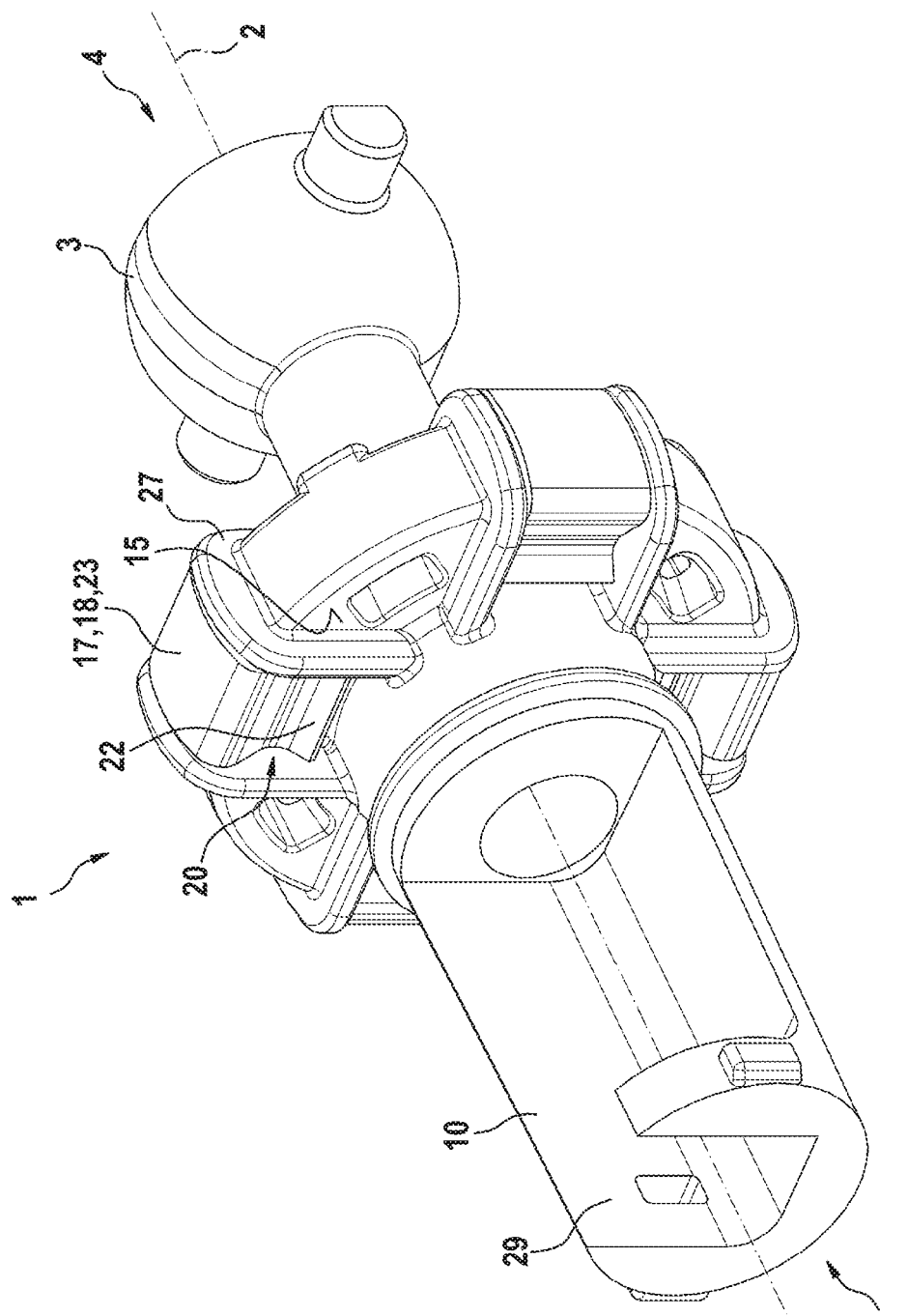
FIG. 2 shows the rotary operating element according to the invention from FIG. 1 in a perspective illustration in another view.
Figure 3:
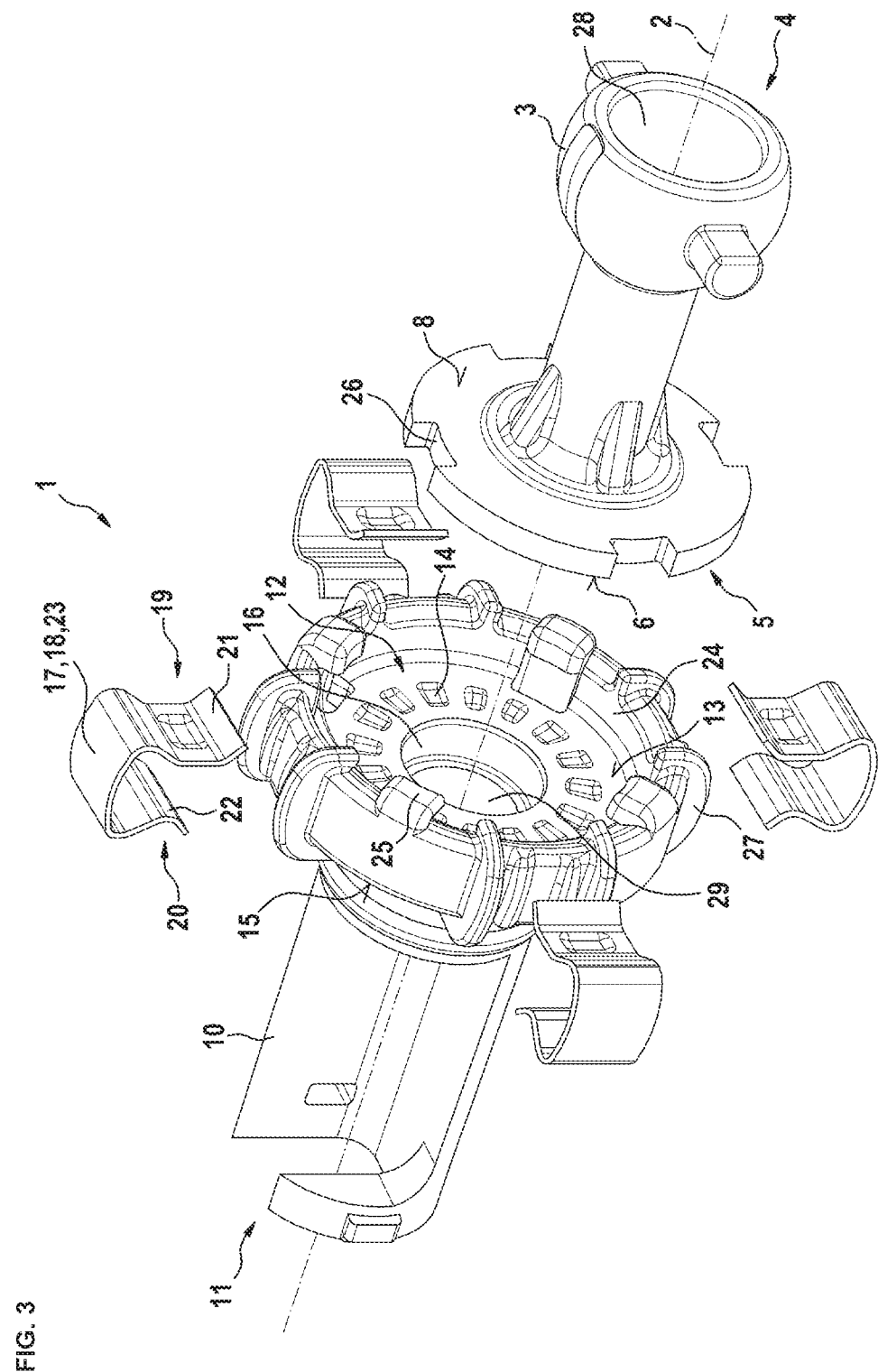
FIG. 3 shows the rotary operating element according to the invention in the perspective of FIG. 1 in an exploded view.
Figure 4:
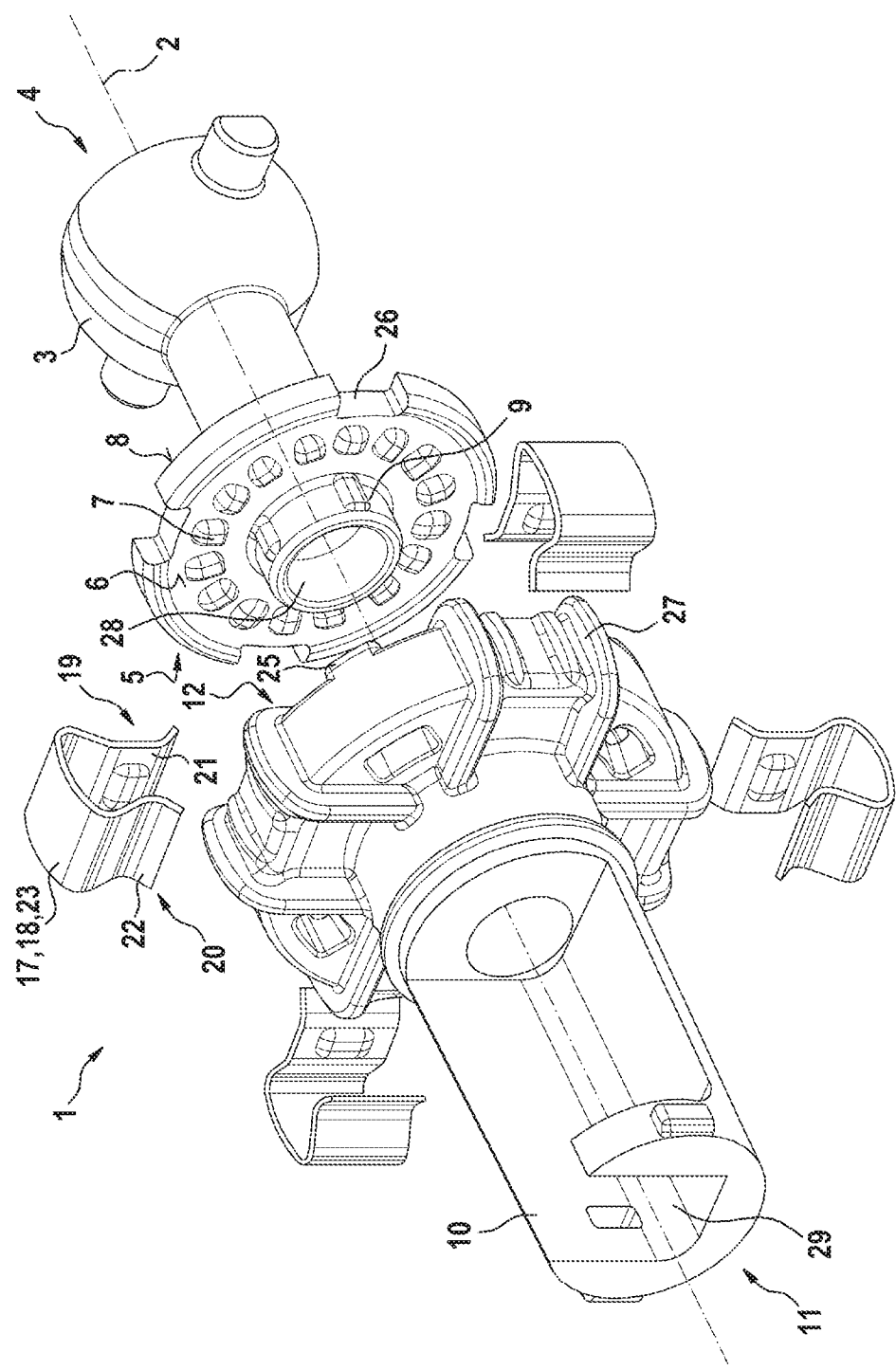
FIG. 4 shows the rotary operating element according to the invention in the perspective of FIG. 2 in an exploded view.

FIGS. 1 and 2 show a rotary operating element 1 according to the invention in a perspective illustration in different views. FIGS. 3 and 4 each show the rotary operating element from FIGS. 1 and 2 in an exploded view. The rotary operating element 1 extends rotationally symmetrically along a rotary operating element longitudinal axis 2. The rotary operating element 1 comprises a first rotation body 3, which is rotationally symmetrical with respect to the rotary operating element longitudinal axis 2 and extends along and is rotatable about the rotary operating element longitudinal axis 2. The first rotation body 3 includes an operating element side 4 for the installation of a handle, a turning knob or the like (not shown). The rotation body 3 furthermore includes a first contact side 5 on which a first circular contact surface 6 is provided. The first contact surface 6 is oriented substantially perpendicularly to the rotary operating element longitudinal axis 2 and rotationally symmetrical thereto. The first contact surface 6 includes a plurality of elevations 7, which form equidistant angles with one another with respect to the rotary operating element longitudinal axis 2. The elevations 7 are disposed on a shared circular arc. On the first contact surface 6, a centering shank 9 is disposed coaxially with respect to the rotary operating element longitudinal axis 2. The centering shank 9 essentially has a cylindrical shape and is rotationally symmetrical with respect to the rotary operating element longitudinal axis 2.

A first circular bearing surface 8, which is rotationally symmetrical with respect to the rotary operating element longitudinal axis 2, is provided between the operating element side 4 and the first contact side 5. The bearing surface 8 is oriented in the direction of the operating element side 4 and faces away from the first contact surface 6. The first bearing surface 8 is moreover oriented perpendicularly to the rotary operating element longitudinal axis 2 and substantially parallel to the first contact surface 6.

The rotary operating element 1 comprises a second rotation body 10, which is rotationally symmetrical with respect to the rotary operating element longitudinal axis 2 and extends along and is rotatable about the rotary operating element longitudinal axis 2. The second rotation body 10 includes an output side 11. The output side 11 is designed for the connection to a ventilation nozzle to be controlled (not shown). Facing away from the output side 11, the second rotation body 10 includes a second contact side 12. The second contact side 12 faces the first contact side 5 of the first rotation body 3. A second circular contact surface 13, which is oriented perpendicularly and rotationally symmetrically to the rotary operating element longitudinal axis 2, is disposed on the second contact side 12 of the second rotation body 10. The second contact surface 13 includes a plurality of depressions 14, which form equidistant angles with one another with respect to the rotary operating element longitudinal axis 2. The depressions are disposed on a shared circular arc and extend in the direction of the output side 11. The number of elevations 7, the geometry thereof and the arrangement thereof on the first contact surface 6 correspond to the number of depressions 14 and the geometry and arrangement thereof on the second contact surface 13. The shape of the elevations 7 corresponds to the shape of the depressions 14, so that the elevations 7 and the depressions 14 cooperate in a form-locked and clearance-fit-like manner. If the elevations 7 are engaged in the depressions 14, and the first contact surface 6 thus bears against the second contact surface 13, the second rotation body 10 can be rotated by a rotation of the first rotation body 3 about the rotary operating element longitudinal axis 2. The rotational energy is transferred from the first rotation body 3 to the second rotation body 10.

A second circular bearing surface 15, which is rotationally symmetrically configured with respect to the rotary operating element longitudinal axis 2, is provided between the output side 11 and the second contact side 12. The second bearing surface 15 is oriented in the direction of the output side 11 and faces away from the second contact surface 13. Moreover, the second contact surface 13 faces the first contact surface 6. The second bearing surface 15 is moreover oriented perpendicularly to the rotary operating element longitudinal axis 2 and substantially parallel to the second contact surface 13.

The second rotation body 10 includes a centering depression 16, which is oriented coaxially with respect to the rotary operating element longitudinal axis 2. The centering depression 16 extends from the second contact side 12 in the direction of the output side 11, wherein the centering depression 16 extends further in the direction of the output side 11 than the depressions 14. When the first rotation body 3 is in contact with the second rotation body 10, as is shown in FIGS. 1 and 2, the centering shank 9 of the first rotation body 3 and the centering depression 16 in the second rotation body 10 cooperate in a clearance-fit-like manner and form a kind of pivot bearing of the operating element 1. The centering shank 9 and the centering depression 16 ensure that the first rotation body 3 cannot tilt with respect to the second rotation body 10, and that the first and second rotation bodies 3, 10 are oriented, at all times, coaxially to one another and with respect to the rotary operating element longitudinal axis 2. This orientation is additionally supported by a circumferential edge 24, which is provided on the outer circumference of the second rotation body 10. The edge 24 protrudes over the first contact surface 6 and the first bearing surface 8 in the direction of the operating element side 4 and likewise ensures a centering effect for the first and second rotation bodies 3, 10. In addition, four securing studs 25 are disposed on the edge, which extend in the direction of the rotary operating element longitudinal axis 2. The securing studs 25 have a four-fold rotational symmetry and correspond to four securing grooves 26, which are disposed in the first rotation body 3, extending from an outer circumference of the first contact surface 6 and the first bearing surface 8 in the direction of the rotary operating element longitudinal axis 2. Together with the securing grooves 26, the securing studs 25 ensure that the first and second rotation bodies 3, 10 can only be disconnected from one another when the securing grooves 26 and the securing studs 25 are congruently oriented.

So as to connect the first rotation body 3 to the second rotation body 10, the rotary operating element 1 comprises four tensioning elements 17, which have a four-fold rotational symmetry with respect to the rotary operating element longitudinal axis 2. The tensioning elements 17 are held on the first and second rotation bodies 3, 10 by retaining elements 27, wherein the retaining elements 27 ensure that the tensioning elements 17 remain stationary with respect to the first and second rotation bodies 3, 10 and cannot be twisted with respect to the rotary operating element longitudinal axis 2. The tensioning elements 17 are configured as U-shaped clamps 18, wherein each clamp 18 has a first end 19 and a second end 20. The first end 19 corresponds to a first spring leg 21, and the second end 20 corresponds to a second spring leg 22. The first and second spring legs 21, 22 are connected to one another by a connecting web 23. The clamps 18 can be placed onto the first bearing surface 8 or second bearing surface 15 in the radial direction with respect to the rotary operating element longitudinal axis 2, so as to connect the first rotation body 3 to the second rotation body 10. Moreover, the clamps 18 can be pulled off the first bearing surface of the first surface 8 or the second bearing surface 15 in the radial direction with respect to the rotary operating element longitudinal axis 2, whereby the first rotation body 3 can be disconnected from the second rotation body 10. The clamps 18 hold the elevations 7 of the first rotation body 3 in the depressions 14 of the second rotation body 10, whereby torque of the first rotation body 3 can be transferred to the second rotation body 10. A tensioning force of the clamps 18 is selected to be so large that, starting at a particular predetermined torque threshold value, the elevations 7 disengage from the depressions 14. Chamfers, which allow the depressions 14 to glide with respect to the elevations 7, are provided for this purpose. During further rotation, the elevations 7 re-engage in the depressions 14. An elevation 7 thus "jumps" into an adjoining depression 14, which provides a user of the rotary operating element 1 with clear haptic feedback. The mechanism of action of the rotary operating element 1 allows a ventilation nozzle to be controlled so as to be protected against faulty operation damaging the ventilation nozzle. Such a faulty operation occurs, for example, when the ventilation nozzle has reached an end stop, while the user continues to turn.

So as to be able to run electrical feed lines for the ventilation nozzle to be operated through the rotary operating element 1, for example, the first rotation body 3 includes a first through-opening 28, and the second rotation body 10 includes a second through-opening 29. The first and second through-openings 28, 29 extend along the rotary operating element longitudinal axis 2 and are rotationally symmetrically configured thereto.

LIST OF REFERENCE NUMERALS 1 rotary operating element
2 rotary operating element longitudinal axis
3 first rotation body
4 operating element side
5 first contact side
6 first contact surface
7 elevations
8 first bearing surface
9 centering shank
10 second rotation body
11 output side
12 second contact side
13 second contact surface
14 depressions
15 second bearing surface
16 centering depression
17 tensioning element
18 clamp
19 first end of the clamp
20 second end of the clamp 21 first spring leg of the clamp
22 second spring leg of the clamp
23 connecting web
24 edge
25 securing stud
26 securing groove
27 retaining element
28 first through-opening
29 second through-opening

The invention claimed is:

1. A rotary operating element for operating a ventilation nozzle in an automobile passenger compartment, comprising:
- a first rotation body extending along a rotary operating element longitudinal axis, the first rotation body including an operating element side and a first contact side located opposite the operating element side, the first rotation body extending between the operating element side and the first contact side,
- a first contact surface oriented perpendicularly with respect to the rotary operating element longitudinal axis being formed on the first contact side, and
- a second rotation body extending along the rotary operating element longitudinal axis, the second rotation body including an output side and a second contact side located opposite the output side, the second rotation body extending between the output side and the second contact side, a second contact surface oriented perpendicularly with respect to the rotary operating element longitudinal axis being formed on the second contact side,
- the first and second contact surfaces being held in operative connection in a force-fit and/or form-locked manner by a tensioning element, whereby the first rotation body is held non-rotatably relative to the second rotation body with respect to the rotary operating element longitudinal axis up to a predetermined torque,
- wherein a tensioning force applied by the tensioning element on the first and second contact surfaces is such that the first and second contact surfaces are operatively disconnected when a torque acting on the first rotation body exceeds the predetermined torque, and
- wherein the tensioning element is disposed on the first and second rotation bodies, radially spaced apart from the rotary operating element longitudinal axis.

2. The rotary operating element according to claim 1, wherein the first rotation body comprises a first bearing surface, the first bearing surface being disposed between the first contact surface and the operating element side, and the second rotation body comprises a second bearing surface, the second bearing surface being disposed between the second contact surface and the output side, and the tensioning element includes a first and a second end, the first end being operatively connected to the first bearing surface and the second end being operatively connected to the second bearing surface.

3. The rotary operating element according to claim 2, wherein a plurality of tensioning elements, including the tensioning element, are each operatively connected to the first and second bearing surfaces.

4. The rotary operating element according to claim 3, wherein the plurality of tensioning elements are disposed rotationally symmetrically with respect to the rotary operating element longitudinal axis.

5. The rotary operating element according to claim 2, wherein the tensioning element is configured as a U-shaped clamp, and configured to be pulled off the first bearing surface of the first rotation body and off the second bearing surface of the second rotation body in a direction radially from the rotary operating element longitudinal axis, whereby the first rotation body is configured to be disconnected from the second rotation body.

6. The rotary operating element according to claim 5, wherein the tensioning element is configured to be pulled radially off the first bearing surface of the first rotation body and off the second bearing surface of the second rotation body with respect to the rotary operating element longitudinal axis, whereby the first rotation body is configured to be disconnected from the second rotation body.

7. The rotary operating element according to claim 1, wherein the first contact surface includes a plurality of elevations, which are rotationally symmetrical with respect to the rotary operating element longitudinal axis and extend towards the second contact surface, and which correspond to a plurality of depressions in the second contact surface so that, when the torque acting on the first rotation body exceeds the predetermined torque, the plurality of elevations disengage from the plurality of depressions.

8. The rotary operating element according to claim 1, wherein the first rotation body includes a first through-opening extending along the rotary operating element longitudinal axis, and the second rotation body includes a second through-opening extending along the rotary operating element longitudinal axis, so that the rotary operating element forms a hollow shaft.

9. The rotary operating element according to claim 1, wherein the tensioning element is made of an elastic metal or plastic material.

10. The rotary operating element according to claim 1, wherein the first and second rotation bodies are made of a plastic material.

* * * * *